United States Patent
Wus et al.

(10) Patent No.: US 9,268,993 B2
(45) Date of Patent: Feb. 23, 2016

(54) REAL-TIME FACE DETECTION USING COMBINATIONS OF LOCAL AND GLOBAL FEATURES

(71) Applicant: Futurewei Technologies, Inc., Plano, TX (US)

(72) Inventors: John Wus, Yardley, NJ (US); Yi Ding, San Gabriel, CA (US); Zhenyu Wu, Plainsboro, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 202 days.

(21) Appl. No.: 13/801,378

(22) Filed: Mar. 13, 2013

(65) Prior Publication Data

US 2014/0270490 A1 Sep. 18, 2014

(51) Int. Cl.
*G06K 9/00* (2006.01)
*G06K 9/46* (2006.01)
*G06K 9/40* (2006.01)

(52) U.S. Cl.
CPC ........ *G06K 9/00248* (2013.01); *G06K 9/00234* (2013.01)

(58) Field of Classification Search
None
See application file for complete search history.

(56) References Cited

U.S. PATENT DOCUMENTS

| | | | |
|---|---|---|---|
| 7,590,267 B2 * | 9/2009 | Xiao et al. | 382/118 |
| 7,916,905 B2 * | 3/2011 | Yen et al. | 382/118 |
| 8,706,663 B2 * | 4/2014 | Nc et al. | 706/20 |
| 8,818,034 B2 * | 8/2014 | Zhang et al. | 382/103 |
| 2007/0041644 A1 * | 2/2007 | Kim et al. | 382/190 |
| 2008/0187184 A1 * | 8/2008 | Yen | 382/118 |
| 2010/0158325 A1 * | 6/2010 | Piramuthu et al. | 382/118 |

FOREIGN PATENT DOCUMENTS

| | | | |
|---|---|---|---|
| CN | 101383001 A | 3/2009 | |
| CN | 102214291 A | 10/2011 | |
| CN | 102324025 A | 1/2012 | |
| WO | 99/23600 | * 5/1999 | G06K 9/00 |

OTHER PUBLICATIONS

Lin, et al. (Face Detection Algorithm Based on Haar and Local Binary Pattern Features), Journal of Convergence Information Technology, vol. 7, No. 19, Oct. 2012, pp. 1-9.*
Viola, P., et al., "Rapid Object Detection Using a Boosted Cascade of Simple Features," Proceedings of the 2001 IEEE Computer Society Conference on Computer Vision and Pattern Recognition, 2001, vol. 1, pp. I-511-I-518.
"International Telecommunication Union, Recommendation ITU-R BT.601-7, Studio Encoding Parameters of Digital Television for Standard 4:3 and Wide-Screen 16:9 Aspect Ratios, BT Series, Broadcasting Service (Television)," Mar. 2011, 19 pages.
"Recommendation ITU-R BT.709.4, Parameter Values for the HDTV Standards for Production and International Programme Exchange, Question ITU-R 27/11)," 1990-1994-1995-1998-2000, 30 pages.

(Continued)

*Primary Examiner* — Daniel Mariam
(74) *Attorney, Agent, or Firm* — Conley Rose, P.C.; Grant Rodolph; Jonathan K. Polk

(57) ABSTRACT

An apparatus comprises a processor configured to: input an image; detect a skin area in the image to obtain an expanded rectangular facial candidate area; detect a face in the expanded rectangular facial candidate area to obtain an initial detected facial area; subject the initial detected facial area to a false alarm removal; and output a detected facial area.

20 Claims, 5 Drawing Sheets

(56) References Cited

OTHER PUBLICATIONS

Daubechies, I., et al., "Factoring Wavelet Transforms into Lifting Steps," Journal of Fourier Analysis Applications, vol. 4, Nr. 3, 1998, pp. 247-269.
Chai, D., et al., "Face Segmentation Using Skin-Color Map in Videophone Applications," IEEE Transactions on Circuits and Systems for Video Technology, vol. 9, No. 4, Jun. 1999, pp. 551-565.
Ahonen, T., et al., "Face Description with Local Binary Patterns: Application to Face Recognition," IEEE Transactions on Pattern Analysis and Machine Intelligence, vol. 28, No. 12, Dec. 2006, pp. 2037-2042.
Dalal, N., et al., "Histograms of Oriented Gradients for Human Detection," Proceedings of the IEEE Computer Society Conference on Computer Vision and Pattern Recognition (CVPR '05), 2005, 8 pages.
Jolliffe, I.T., "Principal Component Analysis," Second Edition, Springer, 2002, 518 pages.
Partial English Translation and Abstract of Chinese Patent Application No. CN102214291A, Sep. 2, 2014, 18 pages.
Foreign Communication From A Counterpart Application No. PCT Application No. PCT/CN2014/073272, International Search Report dated Jun. 3, 2014, 7 pages.
Foreign Communication From A Counterpart Application No. PCT Application No. PCT/CN2014/073272, Written Opinion dated Jun. 3, 2014, 6 pages.

* cited by examiner

REAL-TIME FACE DETECTION USING COMBINATIONS OF LOCAL AND GLOBAL FEATURES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Typically, video involves displaying a sequence of still images or frames in relatively quick succession, thereby causing a viewer to perceive motion. Each frame may comprise a plurality of picture elements or pixels, each of which may represent a single reference point in the frame. The amount of data needed to depict even a short video segment may be substantial, resulting in difficulties when the data is communicated across a network with limited bandwidth capacity. Video may therefore be compressed via video compression hardware or software on a device that is the source of the video. The compression may be part of an encoding process prior to the video stream being communicated across the network, which decreases the quantity of data needed to communicate the video. Video may then be decompressed via video decompression hardware or software on a device that is the receiver of the video as part of a decoding process. Improved compression and decompression techniques may increase compression ratios, and thus reduce the amount of data necessary to communicate video without substantially reducing video quality. In addition, improved compression and decompression techniques may improve video quality.

SUMMARY

In one embodiment, the disclosure includes an apparatus comprising a processor configured to: input an image; detect a skin area in the image to obtain an expanded rectangular facial candidate area; detect a face in the expanded rectangular facial candidate area to obtain an initial detected facial area; subject the initial detected facial area to a false alarm removal; and output a detected facial area.

In another embodiment, the disclosure includes an apparatus comprising a receiver configured to receive encoded data, wherein the encoded data is based on unencoded data, and wherein the unencoded data is based on: an expanded rectangular facial candidate based on smoothing, downsampling, and evaluation for skin color of an image; an initial detected facial area based on sparse local features from the expanded rectangular facial candidate area; and a detected facial area based on false alarm removal using dense local features and global features from the initial detected facial area; and a processor configured to decode the encoded data.

In yet another embodiment, the disclosure includes a method comprising receiving an image; detecting a skin area in the image to obtain an expanded rectangular facial candidate area; detecting a face in the expanded rectangular facial candidate area to obtain an initial detected facial area; subjecting the initial detected facial area to a false alarm removal; and outputting a detected facial area.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
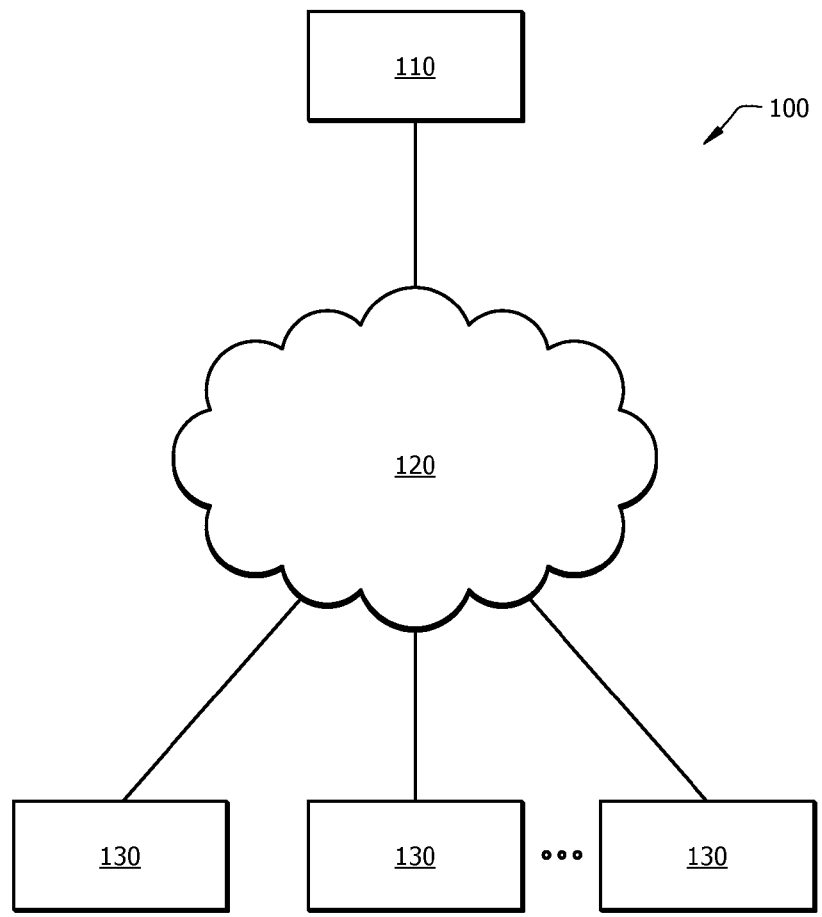
FIG. 1 is a schematic diagram of a communication system according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Face detection may refer to a technique for processing an image or video in order to determine the location and size of human faces. Face detection may be real-time, meaning the processing may occur while the image or video is being taken. Face detection is an important technique for many applications, including face tracking, face recognition, and expression identification. In videoconferencing, the facial area typically attracts the interest of users and may be considered a primary region of interest (ROI); thus, face detection may be an important aspect of video encoding, decoding, processing, and transmission. Due to the demands of high-definition (HD) video, real-time face detection may pose problems due to its computational complexity and unreliability. For example, many current real-time face detection techniques are based on the Viola and Jones method described in "Rapid Object Detection using a Boosted Cascade of Simple Features," Paul Viola and Michael Jones, IEEE Proc. CVPR, 2001, which is incorporated by reference as if reproduced in its entirety. The Viola and Jones method uses Haar-like features with a cascade of AdaBoost classifiers to detect faces in an image. The techniques using the Viola and Jones method and other known techniques may be computationally intensive, and thus difficult to implement and inaccurate for real-time applications; on mobile devices with limited hardware, software, or network resources; or when processing high-resolution images and video.

Disclosed herein are systems and methods for an improved real-time face detection technique. The technique may apply to videoconferencing, telepresence, and other applications involving images or videos. With this technique, global features using skin color, sparse local features using local binary patterns (LBPs), dense local features using a histogram of oriented gradients (HOG), and global features using principal component analysis (PCA) are extracted from the image at different processing stages. Global features may refer to features belonging to an entire image. For example, in the context of face detection, skin may be a global feature. Local features may refer to features belonging to specific areas of an image. For example, in the context of face detection, eyes, mouths, and noses may be local features. By using global features, sparse local features, and dense local features, the disclosed face detection technique may detect human faces in an image or video more accurately, in real time, using less computational load, and with relatively limited resources. Instead of using multiple face detectors sequentially to detect faces with different view angles, the technique may be sensitive to the variation of faces in unconstrained environments. In addition, the technique may be scalable and may use varying sensitivities.

FIG. 1 is a schematic diagram of a communication system 100 according to an embodiment of the disclosure. The communication system 100 may comprise a primary device 110 communicatively coupled to a plurality of secondary devices 130 via a network 120. The primary device 110 may be a mobile phone, tablet computer, or other device. Each of the secondary devices 130 may likewise be a mobile phone, tablet computer, or other device. The network 120 may be the Internet, a wireless mobile phone network, or another network.

The primary device 110 may participate in a video call with at least one of the secondary devices 130. The primary device 110 and each of the participating secondary devices 130 may transmit and receive data to participate in the video call. For example, the primary device 110 may capture data via a camera (not shown), encode the data, and transmit that encoded data to the participating secondary devices 130. At the same time, the primary device 110 may receive encoded data from the participating secondary devices 130 and decode that received data. The primary device 110 and each of the secondary devices 130 may perform the above tasks and the tasks described below through any combination of hardware and software.

Figure 2:
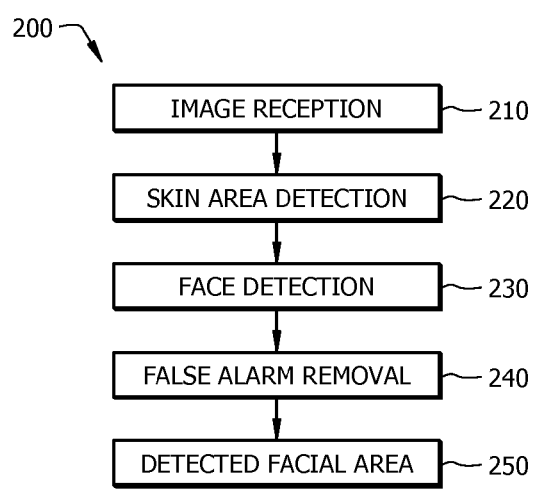
FIG. 2 is a flowchart illustrating a process for face detection according to an embodiment of the disclosure.

FIG. 2 is a flowchart illustrating a process 200 for face detection according to an embodiment of the disclosure, e.g., between the primary device 110 and the participating secondary devices 130. At step 210, the primary device 110 may receive an image. The image may be a single image or may be a video frame from a video. The image may be taken by the primary device 110 via the camera (not shown). At step 220, the primary device 110 may perform skin area detection, which may reduce the total area of the image to be scanned for a facial area to a facial candidate area. At step 230, the primary device 110 may perform face detection, which may detect a facial area within the facial candidate area. At step 240, the primary device 110 may perform false alarm removal, which may comprise further processing to discard any area that the primary device 110 incorrectly detected as a facial area at step 230. Finally, at step 250, the primary device may output the detected facial area for further processing, which may comprise compression and encoding. Steps 220, 230, and 240 are described more fully below. After the further processing, compression, and encoding, the primary device 110 may transmit the encoded data to any combination of the secondary devices 130. At the same time, the primary device 110 may receive data from any combination of the secondary devices 130. While the disclosed processes are described in a way that the primary device 110 may output one detected facial area from the image, it should be understood that the disclosed processes may provide for the primary device 110 to output more than one detected facial area from the image.

Figure 3:
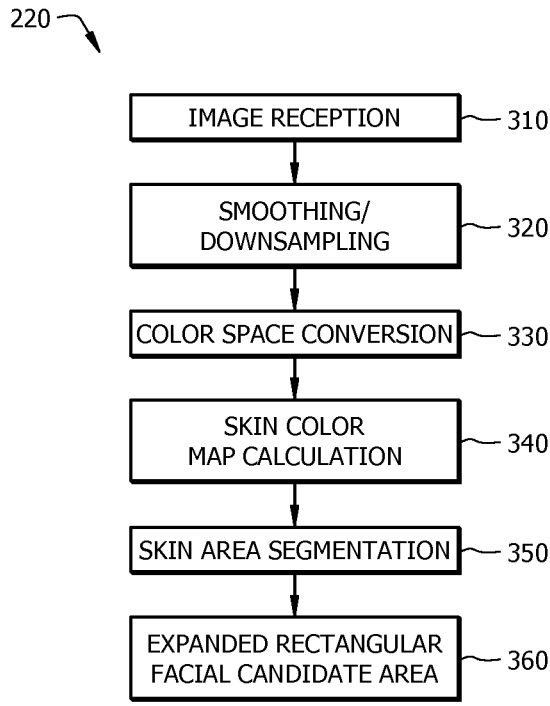
FIG. 3 is a flowchart illustrating a process for skin area detection according to an embodiment of the disclosure.

FIG. 3 is a flowchart illustrating a process 220 for skin area detection according to an embodiment of the disclosure. At step 310, the primary device 110 may receive the image as in step 210 of FIG. 2. Typically, the primary device 110 may have to scan an entire image to detect faces. For a high-resolution image, that process may require significant processing time and power. Accordingly, by first detecting skin areas, the primary device 110 may reduce the area of the image to process for further face detection. In addition, skin color is orientation invariant and is more quickly processed than other facial features.

At step 320, the primary device 110 may perform smoothing and downsampling on the image. Smoothing may refer to the process of applying a filter to a set of data, in this case the image, in order to capture important patterns in the data while removing noise and other unwanted data. For example, a five-by-five Gaussian filter may be used. Downsampling may refer to reducing the sampling rate of the data. For example, for a downsampling factor of one, the primary device 110 may further process an image that is the same size as the original image. For a downsampling factor of two, the primary device 110 may reject even rows and columns of pixels in the image so that the primary device 110 may further process an image that is one-fourth the size of the original image.

At step 330, the primary device 110 may perform a color space conversion on the image. A color space may refer to a mathematical model for describing colors. For example, if the original color space is red-green-blue (RGB), then the primary device 110 may convert the color space from RGB to YCbCr using known conversion methods like the methods described in "Studio encoding parameters of digital television for standard 4:3 and wide-screen 16:9 aspect ratios," ITU-R BT.601-7, 2011 and "Parameter Values for the HDTV Standards for Production and International Programme Exchange," ITU-R BT.709-4, 2000, which are incorporated by reference as if reproduced in their entireties. For an RGB color space, R is the red light, G is the green light, and B is the blue light. The three lights may be added together in various ways to produce colors across the color spectrum. For a YCbCr color space, Y is the luma component, Cb is the blue-difference chroma component, and Cr is the red-difference chroma component. Luma, or luminance, represents the brightness in an image. Chroma, or chrominance, represents the color information in an image. The primary device 110 may convert the color space to color spaces other than YCbCr as well.

At step 340, the primary device 110 may perform a skin color map calculation of the image. The primary device 110 may examine the color value of each pixel of the image to determine whether or not that pixel belongs in a range associated with human skin. For example, if the primary device 110 is using a YCbCr color space, then the primary device 110 may determine the Cb chrominance value, the Cr chrominance value, or both of each pixel. Cb values between 77 and 127 and Cr values between 133 and 173 may be associated with human skin as described in "Face Segmentation Using Skin-Color Map in Videophone Applications," Douglas Chai and King N. Ngan, IEEE Trans. CSVT, 1999 ("Chai"), which is incorporated by reference as if reproduced in its entirety. Cb and Cr values outside those ranges may not be associated with human skin. Based on a comparison of the determined Cb and Cr values of the image pixels to the pre-determined Cb and Cr ranges, the primary device 110 may generate a skin color map describing each pixel of the image as either skin or not skin.

At step 350, the primary device 110 may perform skin area segmentation. Due to noise and scattered distribution, the map produced at step 340 of FIG. 3 may not be smooth and continuous in a way needed to detect faces. The primary device 110 may therefore perform a morphological operation, for example a morphological opening, to remove small separated areas, connect large adjacent areas, and segment the skin area in the skin color map. The small, separated areas may refer to relatively smaller groups of pixels of one type (e.g., either skin or non-skin) that are surrounded by pixels of the other type. The large, adjacent areas may refer to relatively larger groups of pixels of one type that are at least partially touching each other. Segmenting may refer to partitioning of the image into sets of pixels. In this case, the sets of pixels may be either skin or non-skin.

After the morphological operation, the primary device 110 may divide the intensity or brightness aspect of the skin color map into N×N blocks of pixels. For example, if the primary device 110 is using a YCbCr color space, then the primary device 110 may divide the luminance, or Y, aspect of the skin color map into N×N blocks of pixels. If the number of skin pixels in a block is above a set threshold, then the primary device 110 may perform a standard deviation calculation on the block. The threshold may be anywhere from 1 to $N^2$. If the standard deviation is below a set threshold, then the primary device 110 may label all pixels in the block as non-skin. Otherwise, if the standard deviation is above a set threshold, then the primary device 110 may not re-label any pixels. As an example, Chai suggests a standard deviation threshold of 2.

After the standard deviation calculation and pixel re-labeling, the primary device 110 may perform another morphological operation like the one described above. After the second morphological operation, the primary device 110 may determine that a resulting set of pixels labeled as skin pixels represents a facial candidate area.

At step 360, the primary device 110 may determine an expanded rectangular facial candidate area from the facial candidate area. The primary device 110 may expand the facial candidate area from step 350 above to a rectangular area in order to make the proceeding face detection computationally feasible and more responsive to variations or irregularities of facial appearances.

Figure 4:
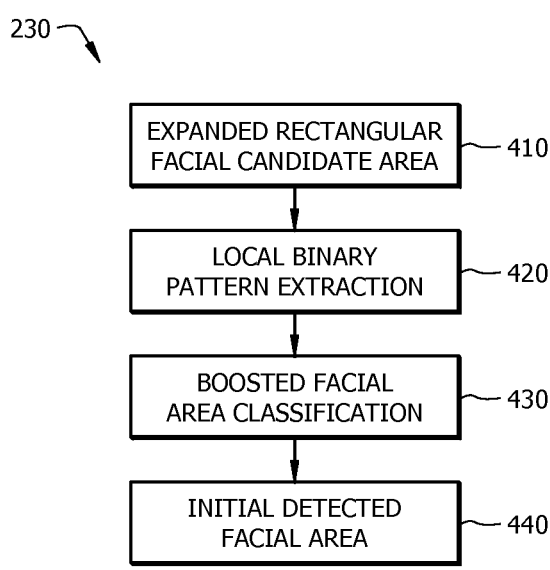
FIG. 4 is a flowchart illustrating a process for face detection according to an embodiment of the disclosure.

FIG. 4 is a flowchart illustrating a process 230 for face detection according to an embodiment of the disclosure. At step 410, the expanded rectangular facial candidate area from step 360 of FIG. 3 may be inputted. In addition to determining an expanded rectangular facial candidate area, it may be beneficial to determine whether or not any features within that expanded rectangular facial candidate area correspond to facial features. Accordingly, the primary device 110 may extract LBPs to detect facial areas. Face detection using LBPs is described in "Face Description with Local Binary Patterns: Application to Face Recognition," Timo Ahonen, et al., IEEE Trans. PAMI, 2006, which is incorporated by reference as if reproduced in its entirety. LBPs have been used as texture descriptors in fields such as image segmentation, image retrieval, and human detection. LBPs may provide a representation of sparse local features by identifying in sub-windows prominent patterns like spots, lines, and corners. By considering different sizes of neighboring pixels, LBPs may be extended to represent patterns with various scales. An LBP technique, which is integer-based, may provide advantages over learning-based and float-based techniques that may be computationally intensive and thus difficult to use in real time for high-resolution images.

At step 420, the primary device 110 may extract LBPs from the expanded rectangular facial candidate area. The primary device 110 may divide the expanded rectangular facial candidate area into sub-windows. The primary device 110 may then create a candidate histogram of LBPs for each sub-window.

Figure 5:
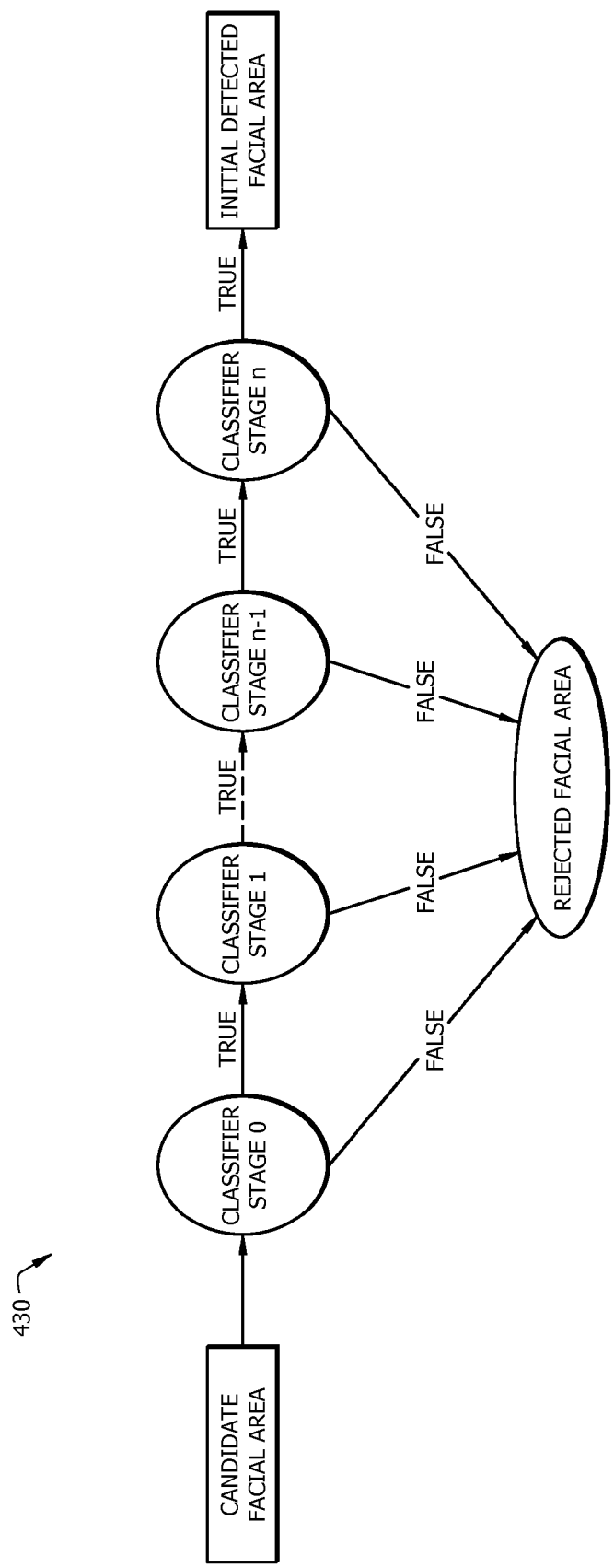
FIG. 5 is a flowchart illustrating a process for boosted facial area classification according to an embodiment of the disclosure.

At step 430, the primary device 110 may employ a series of n boosted classifiers as further shown in FIG. 5. Each boosted classifier may comprise a classifier histogram. Each classifier histogram may be formed by a training stage evaluating the LBPs of images with negative samples (e.g., images with non-faces) and positive samples (e.g., images with faces). The positive samples may comprise faces with variations in yaw, pitch, and rotation. The primary device 110 may adjust the number of samples for a desired performance. For example, 10,000 positive samples and 10,000 negative samples may be used, but there need not be an equal number of positive and negative samples and there may be any number of each. The first boosted classifier may evaluate each sub-window by comparing the boosted classifier's classifier histogram to each sub-window's candidate histogram. Based on the comparison, if the boosted classifier determines that a sub-window has facial features, then the boosted classifier may pass on the sub-window to the next boosted classifier and so on until the nth boosted classifier. If the boosted classifier determines that the sub-window does not have facial features, then it rejects that sub-window and does not pass it on to the next boosted classifier. In order to ensure real-time processing and to balance detection and false alarms, the primary device 110 may use a reasonable number of booster classifiers so that, for example, n is between 15 and 20. Each boosted classifier may be considered a weak classifier, but by cascading the weak classifiers together, a strong classifier may be formed. Because a significant portion of sub-windows may not comprise facial features, each boosted classifier may decrease the number of sub-windows for the subsequent boosted classifier to process. The boosted classifiers may therefore provide progressively increased granularity so that the subsequent, most complex boosted classifiers process the least number of sub-windows.

At step 440, for each sub-window that passes through the nth boosted classifier, the primary device 110 may output that sub-window as part of an initial detected facial area for further processing.

FIG. 5 is a flowchart illustrating a process 430 for boosted facial area classification according to an embodiment of the disclosure. As shown and as discussed for FIG. 4 above, each boosted classifier may examine each sub-window for facial features and either pass on that sub-window to the next stage or reject that sub-window. If the nth boosted classifier determines that a sub-window has facial features, then the primary device 110 may output that sub-window as part of an initial detected facial area for further processing.

Figure 6:
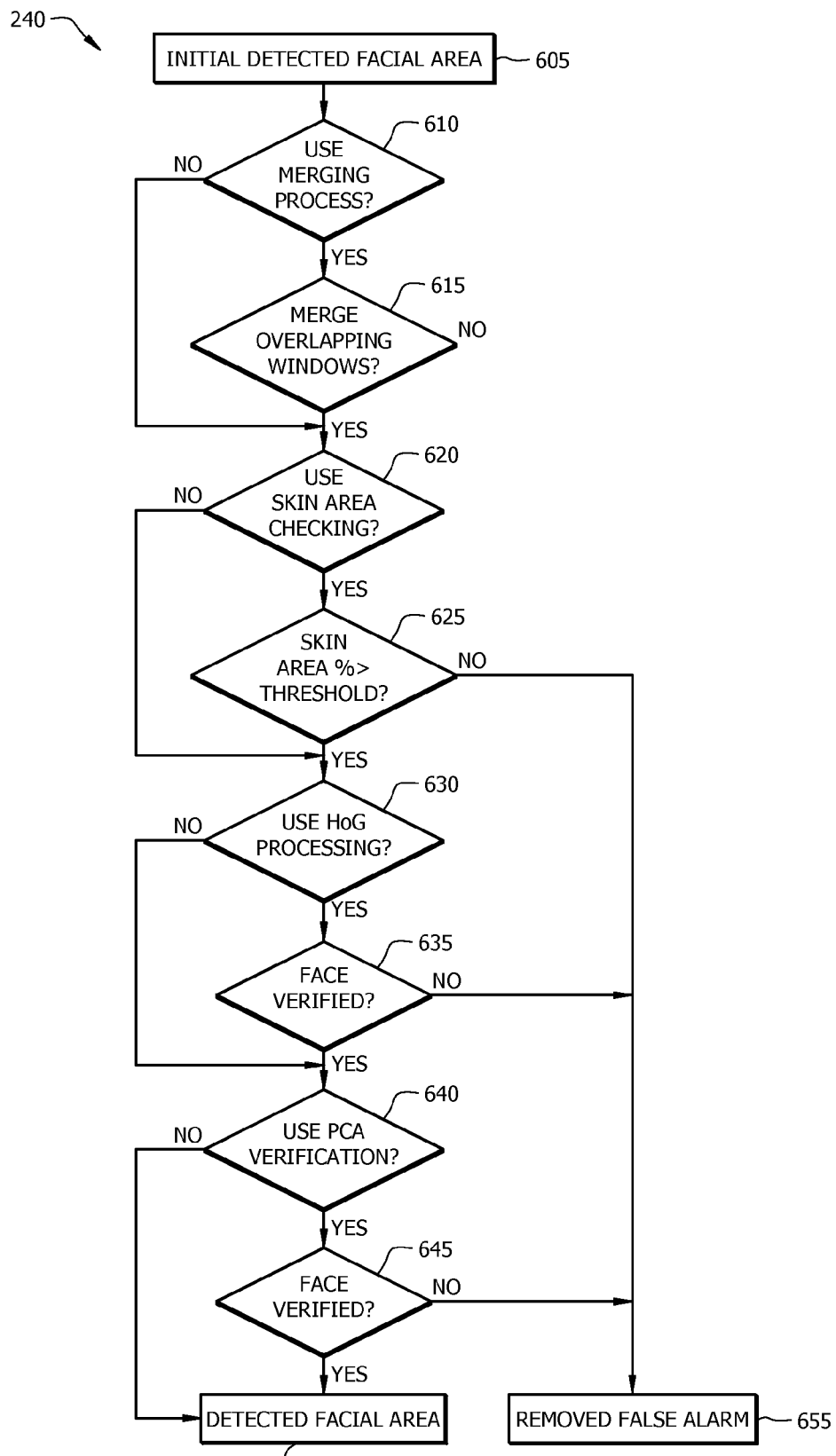
FIG. 6 is a flowchart illustrating a process for false alarm removal according to an embodiment of the disclosure.

FIG. 6 is flowchart illustrating a process 240 for false alarm removal according to an embodiment of the disclosure. At step 605, the initial detected facial area from step 440 of FIG. 4 may be inputted. The face detection described at step 230 of FIG. 2 and in FIG. 4 and FIG. 5 may comprise relaxed constraints in order to detect all possible facial areas. For that reason, the face detection may detect a false facial area, or false alarm. Accordingly, by removing the false alarm, the primary device 110 may more accurately detect a facial area.

At step 610, the primary device 110 may determine whether or not to use a merging process. If not, then the primary device 110 may proceed to step 620. If so, then the primary device 110 may proceed to step 615. At step 615, the primary device may merge overlapping windows, in this case, detected facial areas if there were multiple detected facial areas in the preceding steps. The primary device 110 may do this by first determining if there is any overlap between detected facial areas. If so, then, for each set of two overlapping detected facial areas, the primary device 110 may determine if the overlapped region in the smaller of the two overlapping detected facial areas is above a set threshold. If so, then primary device 110 may combine the two detected facial areas into one detected facial area.

At step 620, the primary device 110 may determine whether or not to use skin area checking. If not, then the primary device 110 may proceed to step 630. If so, then the primary device 110 may proceed to step 625. Steps 625, 635, and 645 may each progressively reduce the number of false alarms. At step 625, the primary device 110 may check for skin area. In the skin detection stage described at step 220 of FIG. 2 and described in FIG. 3, the skin area may be extended to ensure that a face that displays only a partial area of skin due to an occlusion or distortion is not missed. That extension, however, may introduce false alarms. Accordingly, the primary device 110 may again compare the detected facial area to the skin color map. This time, the primary device 110 may determine if the percentage of the detected facial area that is skin is above a set threshold. If so, then the primary device 110 may proceed to step 630. If not, then the primary device 110 may proceed to step 655 and remove the false alarm.

At step 630, the primary device 110 may determine whether or not to use HOG processing. If not, then the primary device 110 may proceed to step 640. If so, then the primary device 110 may proceed to step 635. At step 635, the primary device 110 may verify whether the detected facial areas comprise faces. The process described in FIG. 4 and FIG. 5 mainly relies on local facial features like the patterns of eyes, noses, and mouths. Similar patterns may be found in objects other than faces. Accordingly, the primary device 110 may examine dense local features using HOG descriptors in order to verify if the detected facial areas comprise faces. Analyzing dense local features using HOG features is described in "Histograms of Oriented Gradients for Human Detection," Navneet Dalal and Bill Triggs, IEEE Proc. CVPR, 2005, which is incorporated by reference as if reproduced in its entirety. The primary device 110 may use HOG descriptors to examine training images to generate HOG feature vectors indicating facial areas. The primary device 110 may then build a support vector machine (SVM) classifier from the HOG feature vectors. Finally, the primary device 110 may extract HOG feature vectors from the detected facial areas, compare those extracted HOG feature vectors to the SVM classifier, and determine whether or not the detected facial areas comprise faces. If so, then the primary device 110 may proceed to step 640. If not, the primary device 110 may proceed to step 655 and remove the false alarm.

At step 640, the primary device 110 may determine whether or not to use PCA. If not, then the primary device 110 may proceed to step 650 and output all remaining detected facial areas for further processing. Step 650 may correspond to step 250 of FIG. 2. If so, then the primary device 110 may proceed to step 645. At step 645, the primary device 110 may verify whether or not the detected facial area comprises a face. PCA is a facial recognition technique that analyzes global features. PCA is described in "Principal Component Analysis, Second Edition," I. T. Jolliffe, 2002, which is incorporated by reference as if reproduced in its entirety. Using training images, the primary device 110 may build a face space to represent the global features of faces. The primary device 110 may then determine whether or not a distance between the face space and the detected facial area is below a set threshold. If not, then the primary device 110 may proceed to step 655 and remove the false alarm. If so, then the primary device 110 may proceed to step 650 and output the detected facial area.

Figure 7:
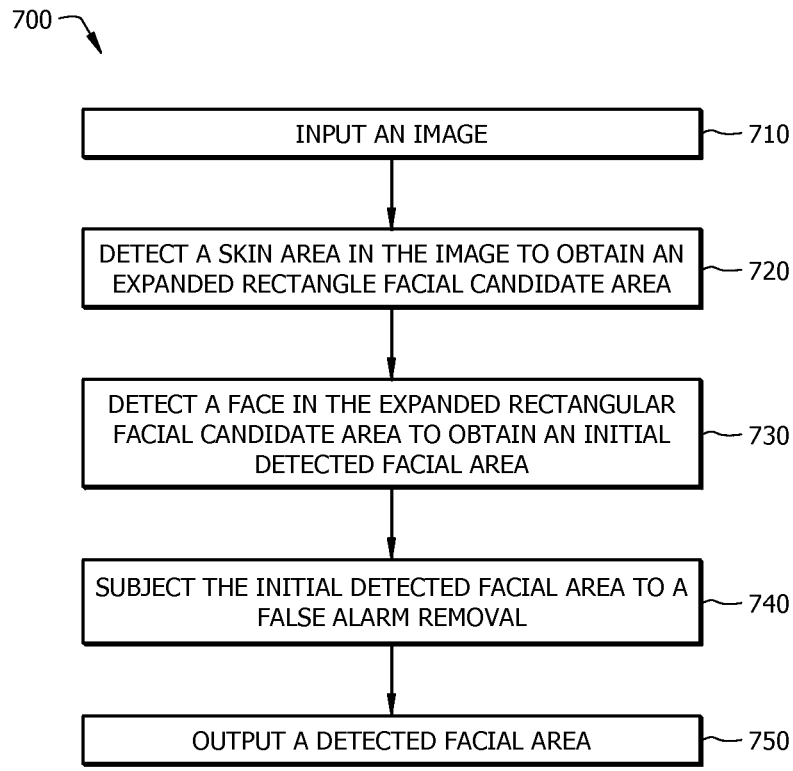
FIG. 7 is a flowchart illustrating a method according to an embodiment of the disclosure.

FIG. 7 is a flowchart illustrating a method 700 according to an embodiment of the disclosure. The method may be implemented on the primary device 110. At step 710, an image may be inputted. The image may be the same as described at step 210 of FIG. 2 and at step 310 of FIG. 3. At step 720, a skin area in the image may be detected to obtain an expanded rectangular facial candidate area. The skin area may be the same as the facial candidate area as described at step 350 of FIG. 3. The expanded rectangular facial candidate area may be the same as described at step 360 of FIG. 3 and at step 410 of FIG. 4. At step 730, a face may be detected in the expanded rectangular facial candidate area to obtain an initial detected facial area. The initial detected facial area may be the same as described at step 440 of FIG. 4 and at step 605 of FIG. 6. At step 740, the initial detected facial area may be subjected to a false alarm removal. The false alarm removal may be the same as described at step 240 of FIG. 2 and at FIG. 6. At step 750, a detected facial area may be outputted. The detected facial area may be the same as described at step 250 of FIG. 2 and at step 650 of FIG. 6.

Figure 8:
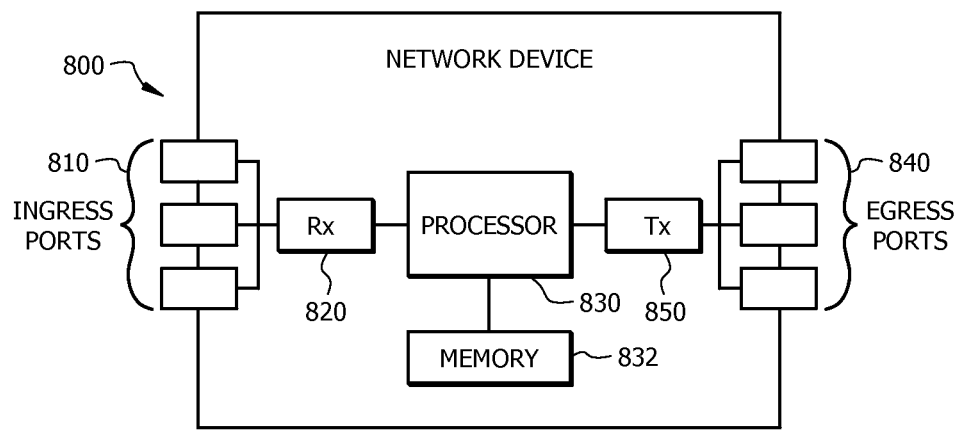
FIG. 8 is a schematic diagram of a network device according to an embodiment of the disclosure.

FIG. 8 is a schematic diagram of a network device 800 according to an embodiment of the disclosure. The network device 800 may comprise a plurality of ingress ports 810 and/or receiver units (Rx) 820 for receiving data, a processor or logic unit 830 to process signals, a plurality of egress ports 840 and/or transmitter units (Tx) 850 for transmitting data to other components, and a memory 832. The network device 800 may be suitable for implementing the features, methods, and devices described above, including the primary device 110 and the secondary devices 130 illustrated in FIG. 1 and described in the disclosure.

The processor 830 (which may be referred to as a CPU) may be in communication with the ingress ports 810, receiver units 820, egress ports 840, transmitter units 850, and memory 832. The processor 830 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs.

The memory 832 may be comprised of one or more disk drives or tape drives, may be used for non-volatile storage of data and as an over-flow data storage device, may be used to store programs when such programs are selected for execution, and may be used to store instructions and perhaps data that are read during program execution. The memory 832 may be volatile and/or non-volatile and may be read only memory (ROM) and/or random access memory (RAM).

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
   a memory; and
   a processor configured to:
      input an image;
      detect a skin area in the image to obtain an expanded rectangular facial candidate area;
      detect a face in the expanded rectangular facial candidate area to obtain an initial detected facial area, wherein the expanded rectangular facial area is based on at least one of smoothing, downsampling, and a morphological operation;
      subject the initial detected facial area to a false alarm removal, wherein the false alarm removal comprises histogram of oriented gradients (HOG) processing; and
      output a detected facial area.

2. The apparatus of claim 1, wherein the expanded rectangular facial area is further based on at least one of a color space conversion, a skin color map calculation, and skin area segmentation.

3. The apparatus of claim 2, wherein the smoothing comprises applying a Gaussian filter.

4. The apparatus of claim 2, wherein the color space conversion comprises a conversion from a first color space to a YCbCr color space.

5. The apparatus of claim 4, wherein the first color space is a red-green-blue (RGB) color space.

6. The apparatus of claim 2, wherein the skin color map calculation comprises a comparison between chrominance values in the image and pre-determined chrominance values associated with skin.

7. The apparatus of claim 2, wherein the skin area segmentation comprises:
   a comparison of a number of pixels in a block and a first pre-determined threshold; and
   a comparison of a standard deviation calculation and a second pre-determined threshold.

8. The apparatus of claim 1, wherein the initial detected facial area is based on local binary pattern (LBP) extraction and a series of boosted classifiers.

9. The apparatus of claim 8, wherein the boosted classifiers are trained with a set of first images comprising no facial areas and with a set of second images comprising facial areas.

10. The apparatus of claim 9, wherein the boosted classifiers may be assigned differing levels of granularity.

11. The apparatus of claim 1, wherein the false alarm removal further comprises at least one of merging overlapping windows, skin area checking, and principal component analysis (PCA).

12. An apparatus comprising:
   a receiver configured to receive encoded data,
      wherein the encoded data is based on unencoded data, and
      wherein the unencoded data is based on:
         an expanded rectangular facial candidate based on smoothing, downsampling, and evaluation for skin color of an image;
         an initial detected facial area based on sparse local features from the expanded rectangular facial candidate area; and
         a detected facial area based on false alarm removal using dense local features and global features from the initial detected facial area; and
   a processor configured to decode the encoded data.

13. The apparatus of claim 12, wherein the sparse local features are determined using local binary patterns (LBPs).

14. The apparatus of claim 12, wherein the dense local features are determined using a histogram of oriented gradients (HOG).

15. The apparatus of claim 12, wherein the global features are determined using principal component analysis (PCA).

16. A method comprising:
   receiving an image;
   detecting a skin area in the image to obtain an expanded rectangular facial candidate area;

detecting a face in the expanded rectangular facial candidate area to obtain an initial detected facial area;

subjecting the initial detected facial area to a false alarm removal, wherein the false alarm removal comprises:

determining whether or not to merge overlapping windows; and performing a principal component analysis (PCA); and outputting a detected facial area, wherein the method is performed using a computer or a processor.

17. The method of claim 16, wherein the expanded rectangular facial area is based on at least one of smoothing, down-sampling, a color space conversion, a skin color map calculation, skin area segmentation, and a morphological operation.

18. The method of claim 17, wherein the smoothing comprises applying a Gaussian filter, wherein the color space conversion comprises a conversion from a color space other than YCbCr to a YCbCr color space, wherein the skin color map calculation comprises a comparison between chrominance values in the image and pre-determined chrominance values associated with skin, and wherein the skin area segmentation comprises:

a comparison of a number of pixels in a block and a first pre-determined threshold; and a comparison of a standard deviation calculation and a second pre-determined threshold.

19. The method of claim 16, wherein the initial detected facial area is based on local binary pattern (LBP) extraction and a series of boosted classifiers.

20. The method of claim 16, wherein the false alarm removal further comprises at least one of skin area checking and histogram of oriented gradients (HOG) processing.

* * * * *